(12) United States Patent
Jutte

(10) Patent No.: US 7,215,605 B2
(45) Date of Patent: May 8, 2007

(54) OPTICAL SCANNING DEVICE WITH COMA CORRECTION FOR IMPROVED FOCUS TRACKING SIGNAL

(75) Inventor: Petrus Theodorus Jutte, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 598 days.

(21) Appl. No.: 10/480,668

(22) PCT Filed: Jun. 26, 2002

(86) PCT No.: PCT/IB02/02648

§ 371 (c)(1),
(2), (4) Date: Dec. 12, 2003

(87) PCT Pub. No.: WO03/003360

PCT Pub. Date: Jan. 9, 2003

(65) Prior Publication Data

US 2004/0170105 A1    Sep. 2, 2004

(30) Foreign Application Priority Data

Jun. 29, 2001 (EP) .................. 01202516
Jul. 30, 2001 (EP) .................. 01202910

(51) Int. Cl.
*G11B 7/00* (2006.01)

(52) U.S. Cl. .................................. 369/44.23

(58) Field of Classification Search ............. 369/44.32, 369/44.23
See application file for complete search history.

(56) References Cited

U.S. PATENT DOCUMENTS

| | | | | |
|---|---|---|---|---|
| 4,449,212 A | 5/1984 | Reno | ........................... | 369/44 |
| 4,709,139 A | 11/1987 | Nakamura et al. | .......... | 250/201 |
| 5,496,993 A | 3/1996 | Kasuga | .................... | 250/201.5 |
| 6,304,526 B1 * | 10/2001 | Nagashima et al. | ..... | 369/44.23 |

OTHER PUBLICATIONS

M.Born and E. wolf, "Principles of Optics", pp. 469-470, (Pergamon Press), ISBN 0-08-0296482-4, no date found.
G. Bouwhuis, J. Braat, A. Huijser, "Principles of Optical Disc Systems", pp. 75-80, (Adam Hilger 1985), ISBN 0-85274-785-3.

* cited by examiner

*Primary Examiner*—Thang V. Tran
*Assistant Examiner*—Adam R. Giesy
(74) *Attorney, Agent, or Firm*—Michael E. Belk

(57) ABSTRACT

An optical scanning device (1) includes: a radiation source (4) for supplying a radiation beam (8); a lens system (5) for transforming the radiation beam to a scanning spot (14); and a detection system (6) that includes a quadrant detector (20), an astigmatism generating element (18) for generating a first amount of coma ($W_{31}^a$) so as to transform the radiation beam to a first astigmatic radiation beam (21), and a coma correcting element (19) for generating a second amount of coma ($W_{31}^b$) so as to compensate the first amount of coma. The coma correcting element includes a correction surface (19A) having a shape defined by a function "$H(r, \theta)$" that includes the term "$A.r^3.\cos(\theta)$" wherein: "H" is the position of the correction surface along the optical axis of the lens system, "r" and "$\theta$" designate polar coordinates, and "A" designates a first constant dependent on the second amount of coma.

6 Claims, 5 Drawing Sheets

IMA: 0.000. 0.000 MM

IMA: 0.000. 0.000 MM

OPTICAL SCANNING DEVICE WITH COMA CORRECTION FOR IMPROVED FOCUS TRACKING SIGNAL

Figure 1:
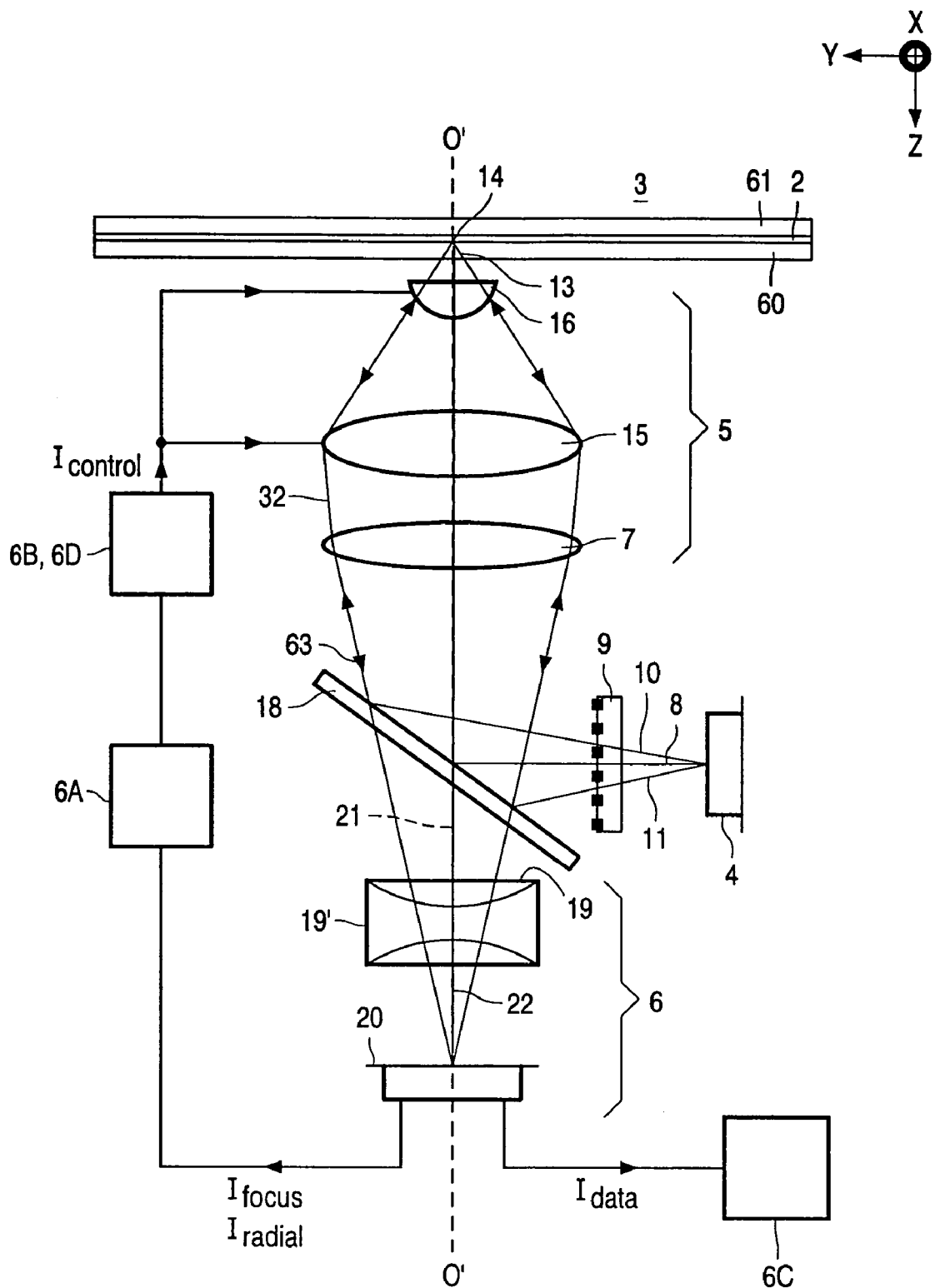

The invention relates to an optical scanning device for scanning an information layer of an optical record carrier, the device including:
- a radiation source for supplying a radiation beam,
- a lens system for transforming said radiation beam to a scanning spot in the position of said information layer, this system having an optical axis, and
- a detection system including:
  - an astigmatism generating element for transforming said radiation beam to a first astigmatic radiation beam, this element further generating a first amount of coma so that the first astigmatic radiation beam includes coma aberration,
  - a coma correcting element for generating a second amount of coma so as to compensate said first amount of coma, thereby transforming said first astigmatic radiation beam to a second astigmatic radiation beam that is substantially free from coma aberration, and
  - a quadrant detector for transforming said second astigmatic radiation beam to an electrical signal.

"Scanning an information layer" refers to scanning by a radiation beam for: reading information from the information layer ("reading mode"), writing information in the information layer ("writing mode"), and/or erasing information from the information layer.

Generally speaking, in a conventional optical scanning device of the type described in the opening paragraph, a "focus error signal" is used for maintaining the scanning spot in focus in the information layer which is to be scanned. This signal is commonly formed from the well-known "astigmatic method" which is known from, inter alia, G. Bouwhuis, J. Braat, A. Huijser et al, "Principles of Optical Disc Systems," 75–80 (Adam Hilger 1985) (ISBN 0-85274-785-3). The astigmatic method is based upon the voluntary introduction of an optical aberration, astigmatism, in the optical path of the radiation beam. Typically, a plane parallel plate that is tilted with an angle of 45 degrees with respect to the optical axis is used as the astigmatism generating element: when the radiation beam traverses this element, astigmatism is generated.

Furthermore, a "radial-tracking error signal" is used for maintaining the scanning spot on track. This signal is commonly formed from the well-known "radial push-pull method" which is known from, inter alia, G. Bouwhuis, J. Braat, A. Huijser et al, "Principles of Optical Disc Systems," 70–73 (Adam Hilger 1985) (ISBN 0-85274-785-3).

A problem encountered with such a conventional optical scanning device resides in that the plane parallel plate generates, apart from astigmatism, an additional aberration, coma. Coma can be expressed in the form of the Seidel coefficient $W_{31}$. The following equation gives the "root-mean-square" $W_{31rms}$, normalized with respect to the wavelength $\lambda$, of the coefficient $W_{31}$:

$$W_{31rms} = \frac{-n^2(n^2-1)\cdot\sin(\alpha)\cdot\cos(\alpha)}{2\cdot(n^2-\sin^2\alpha)^{\frac{5}{2}}} \cdot \frac{d}{\lambda} \cdot \frac{NA^3}{\sqrt{72}} \quad (1)$$

wherein "d" designates the thickness of the plane parallel plate, "n" designates the refractive index of the plane parallel plate, "α" designates the angle of the plane parallel plate with the optical axis (preferably 45 degrees), and "NA" designates the numerical aperture of the radiation beam that is incident to the plane parallel plate. For further information, see e.g. M. Born and E. Wolf, "Principles of Optics," 469–470 (Pergamon Press) (ISBN 0-08-026482-4).

The presence of such a coma aberration is not desired since it affects the focus tracking signal, because the spot on the center of the quadrant-detector is not symmetrical due to the amount of coma generated by the plane parallel plate.

A first solution to this problem consists in reducing the thickness d of the plane parallel plate, since the generated amount of coma (that may be expressed in the form of $W_{31rms}$ as given in Equation (1)) varies proportionally with the thickness d.

However, the first solution has the following drawbacks. Firstly, the thickness of the plane parallel plate also affects the amount of astigmatism generated by the plate, since the plate generates an amount of astigmatism, expressed in the form of the Seidel coefficient $W_{22}$. The following equation gives the "root-mean-square" $W_{22rms}$, normalized with respect to the wavelength $\lambda$, of the coefficient $W_{22}$:

$$W_{22rms} = \frac{(n^2-1)\cdot\sin^2(\alpha)}{2\cdot(n^2-\sin^2\alpha)^{\frac{3}{2}}} \cdot \frac{d}{\lambda} \cdot \frac{NA^3}{\sqrt{24}} \quad (2)$$

wherein "d," "n," "α" and "NA" are the same as those defined in Equation (1). Secondly, even a thin plate generates a substantial amount of coma. For instance, calculations show that a plane parallel plate with a 1.1 mm thickness generates an amount of coma that equals 71 mλrms in the case where NA=0.135, α=45 degrees, n=1.51. Thirdly, the thickness of the plate is preferably larger than 1 mm because of mechanical constraints, especially bending limitations on the carrier.

A second solution consists in reducing the numerical aperture NA of the radiation beam that is incident to the plane parallel plate, since the generated amount of coma (that may be expressed by $W_{31rms}$ as given in Equation (1)) varies with the numerical aperture NA. However, the second solution has the drawback that it also reduces the laser power associated with the radiation source, which also depends on the numerical aperture NA.

Other solutions to the aforementioned problem exist in the state of the art.

U.S. Pat. No. 4,709,139 describes an optical scanning device of the type described in the opening paragraph, wherein the coma correcting element is formed by a plane parallel plate that is tilted oppositely to the astigmatism generating element in respect of the optical axis of the lens system. As a result, the astigmatism generating element and the coma correcting element generate equal amounts of astigmatism that are directed in the same direction, as well as equal amounts of coma that are directed in opposite directions: therefore, the amount of coma generated by the astigmatism generating element is eliminated by the amount of coma generated by the coma correcting element.

However, the device as described in U.S. Pat. No. 4,209,139 has the drawback that it needs an additional plane parallel plate, taking up space, generating an extra amount of astigmatism, and preventing focus adjustment of the spot with the quadrant detector.

U.S. Pat. No. 5,496,993 describes an optical scanning device of the type described in the opening paragraph, wherein the astigmatism generating element is formed by a plane parallel plate and the coma correcting element is formed by a wedge-shaped optical element. The wedge-shaped element has an entrance surface that is inclined in a direction diametrically opposite to the direction of inclination of the plate, thereby producing an amount of coma that is directed diametrically opposite to the direction of the amount of coma generated by the plate. In other words, the amount of coma generated by the wedge-shaped element compensates the amount of coma generated by the plate.

However, the device as described in U.S. Pat. No. 5,496,993 has drawbacks. In particular, the coma correcting element generates, apart from coma, an extra amount of astigmatism.

An object of the invention is to provide an optical scanning device that remedies the aforementioned disadvantages.

In accordance with the invention, these objects are achieved by an optical scanning device as described in the opening paragraph, which is characterized said coma correcting element includes a correction surface having a shape defined by a function "H(r, θ)" that includes the term "A.r³.cos(θ)" wherein: "H" is the position of the correction surface along the optical axis of the lens system, "r" and "θ" designate polar coordinates in a cross-section of the first astigmatic radiation beam, and "A" designates a first constant dependent on the amount of coma generated by the coma correction element.

In a preferred embodiment of the optical scanning device according to the invention, the function "H(r,θ)" is defined by:

$$H(r,\theta)=A.r^3.\cos(\theta)+B.r+C.r^2.\cos^2(\theta-\theta_o)$$

wherein "B," "C" and "θo" designate a second constant, a third constant and a fourth constant, respectively.

An advantage of such a coma correcting element is that it generates the second amount of coma for compensating the first amount of coma, without generating an additional amount of astigmatism and without affecting the amount of astigmatism generated by the astigmatism generating element.

Another advantage of such a coma correcting element is that it reduces the radial-to-focus cross-talk, since the cross-section of the second astigmatic radiation beam is no longer deformed by coma aberration.

Another advantage of such a coma correcting element is that the second astigmatic radiation beam is not tilted, thereby avoiding a shift of the position of the quadrant detector and consequently avoiding an increase in the free working distance.

An advantage of such a coma correcting element is that it may be formed as the entrance surface of a servo lens; the exit surface of the servo lens may be advantageously used for forming, for instance, a negative spherical lens. This advantageously results in allowing focus adjustment of the second astigmatic radiation beam with the quadrant detector, by moving the servo lens in the direction of the optical axis of the lens system and, in the case where the servo lens is not formed by an aspherical lens, by moving the quadrant detector.

Another advantage of such a coma correcting element is that it may be used for focus adjustment of the spot with the quadrant detector.

Figure 2:
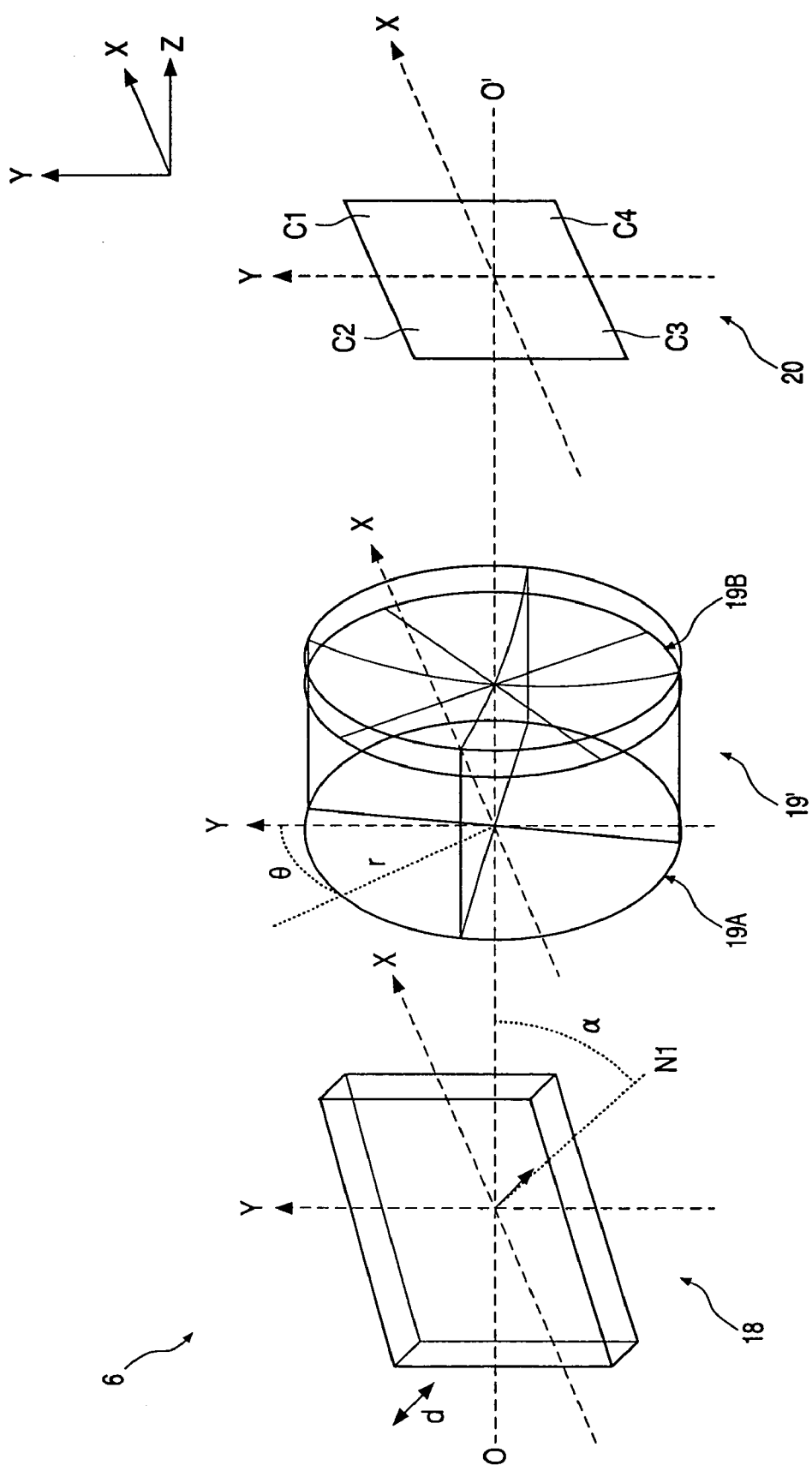
Figure 4:
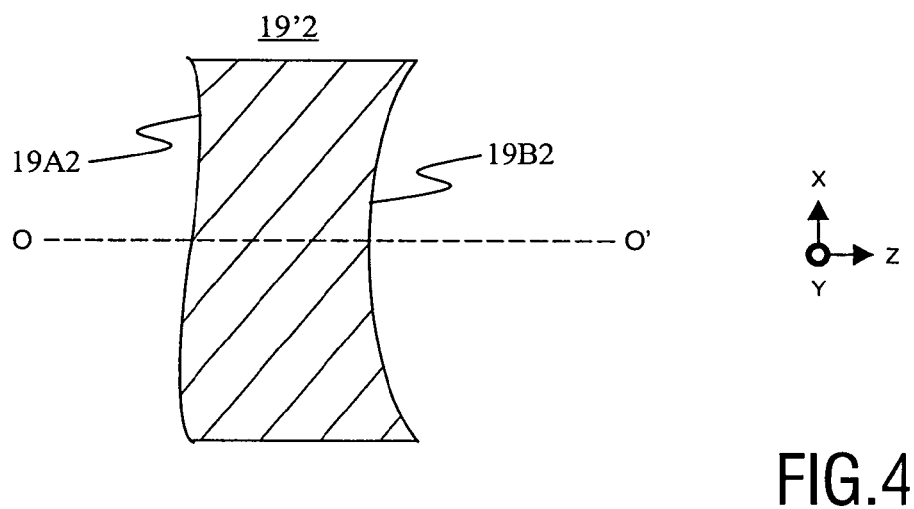
Figure 5:
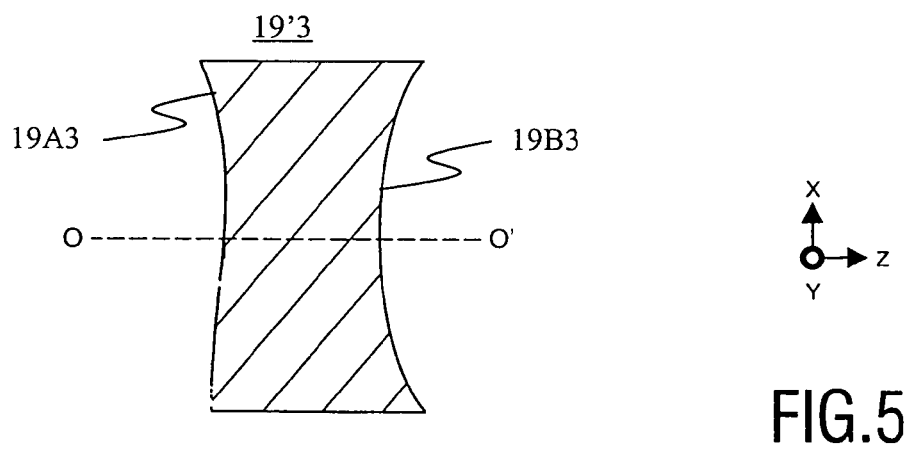
Figure 6A:
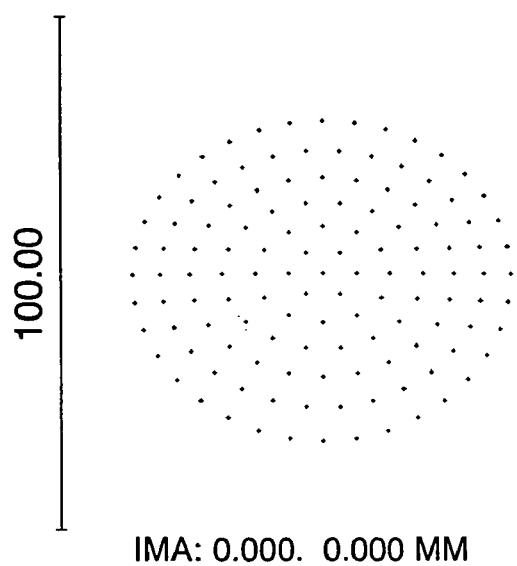
Figure 6B:
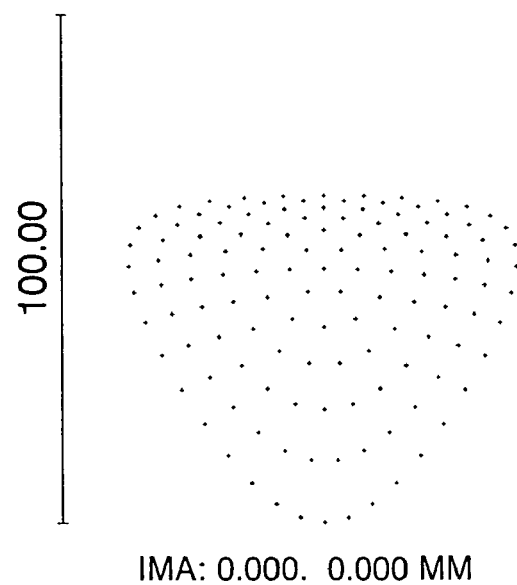
Figure 7A:
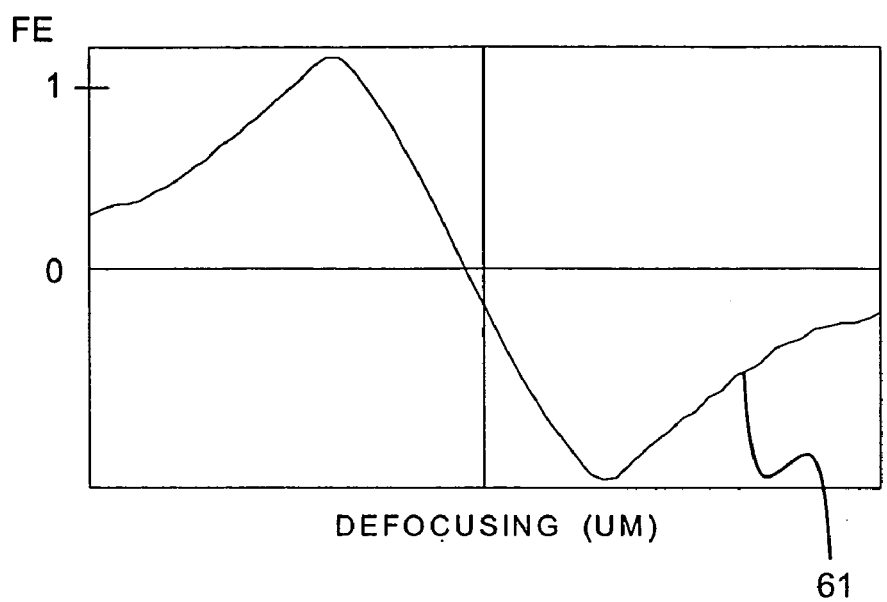
Figure 7B:
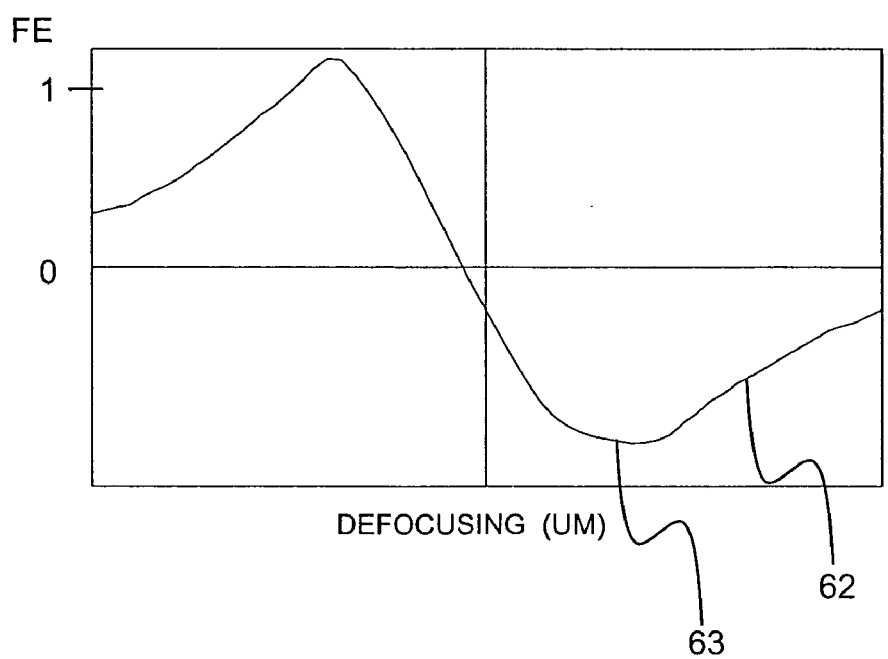

The objects, advantages and features of the invention will be apparent from the following, more detailed description of the invention, as illustrated in the accompanying drawings, in which:

FIG. 1 is a schematic illustration of components of an optical scanning device according to one embodiment of the invention, FIG. 2 is a schematic illustration of components of the detection system shown in FIG. 1, FIG. 3, FIG. 4 and FIG. 5 show the cross-sectional views of first, second and third embodiments of the coma correcting element shown in FIG. 2, respectively, FIGS. 6A and 6B are the schematic representations of cross-sections of the second astigmatic radiation beam on the quadrant detector, with and without correction according to the invention, respectively, and FIGS. 7A and 7B show the focus S-curves measured with respect to the radiation beam that is incident to the quadrant-detector, with and without correction according to the invention, respectively.

FIG. 1 is a schematic illustration of the optical components of an optical scanning device 1 according to the invention for scanning an information layer 2 of an optical record carrier 3.

By way of illustration, the optical record carrier 3 includes a transparent layer 60 on one side of which the information layer 2 is arranged. The side of the information layer facing away from the transparent layer is protected from environmental influences by a protective layer 61. The transparent layer acts as a substrate for the optical record carrier by providing mechanical support for the information layer. Alternatively, the transparent layer may have the sole function of protecting the information layer, while the mechanical support is provided by a layer on the other side of the information layer, for instance by the protection layer or by an additional information layer and transparent layer connected to the uppermost information layer. The information layer 2 is a surface of the carrier 3 containing tracks. A "track" is a path to be followed by a focused radiation on which optically-readable marks that represent information are arranged. The marks may be, e.g., in the form of pits or areas with a reflection coefficient or a direction of magnetization different from the surroundings. In the case where the optical record carrier 3 has the shape of a disc, the following is defined with respect to a given track: the "radial direction" is the direction between the track and the center of the disc and the "tangential direction" is the direction that is tangential to the track and perpendicular to the "radial direction".

During scanning, the record carrier 3 rotates on a spindle (not shown in FIG. 1) and the information layer 2 is then scanned through the transparent layer 60.

As shown in FIG. 1, the optical scanning device 1 includes a radiation source 4, a lens system 5 having an optical axis OO', a beam splitter 18 and a detection system 6. The optical scanning device 1 preferably further includes a servocircuit 6A, a focus actuator 6B, a radial actuator 6D, and an information processing unit 6C for error correction.

The radiation source 4 is arranged for supplying a radiation beam 8. Preferably, the radiation source 4 includes at least one semiconductor laser that emits the radiation beam 8 at a selected wavelength λ. For instance, in the case where the optical record carrier 3 is of a DVD format, the wavelength λ of the radiation beam 8 is between 620 and 700 nm and, preferably, equals 660 nm. More preferably, the optical scanning device 1 further includes a grating structure 9 for forming first and second satellite radiation beams 10 and 11 as the −1 and +1 order diffracted beams from the central radiation beam, that is, the radiation beam 8.

The beam splitter 18 is arranged for reflecting the radiation beam 8 (as well as the satellite radiation beams 10 and 11) toward the lens system 5. Preferably, the beam splitter 18 is formed by a plane parallel plate that is tilted with respect to the optical axis OO' so as to form an angle α with respect to this axis. Preferably, the angle α equals to 45 degrees. Notably, the plane parallel plate is used, apart from its function of beam splitter, for generating astigmatism as described below.

The lens system 5 is arranged for transforming the radiation beam 8 (as well as the satellite radiation beams 10 and 11) to a focused radiation beam 13 so as to form a scanning spot 14 in the position of the information layer 2. The lens system 5 includes a first objective lens 15; it preferably further includes a collimator lens 7 and a second objective lens 16. Preferably, the second objective lens 16 is used together with the first objective lens 15 in the case where the numerical aperture of the radiation beam 8 approximately equals 0.85, while only the first objective lens 15 is used in the case where the numerical aperture of the radiation beam 8 is comprised between 0.45 and 0.65.

The collimator lens 7 is arranged for transforming the radiation beam 8 (as well as the satellite radiation beams 10 and 11) into a substantially collimated beam 12.

The first objective lens 15 is arranged for transforming the collimated radiation beam 12 to a converging radiation beam 17. Furthermore, the objective lens 15 is preferably aspherical.

The second objective lens 16 is arranged for transforming the converging radiation beam 17 to the focused radiation beam 13. It may be formed by a plano-convex lens having a convex surface 15a that faces the objective lens 15 and a flat surface 15b that faces the position of the information layer 2. Notably, the objective lens 16 forms, in cooperation with the objective lens 15, a doublet-lens system that advantageously has a larger tolerance in mutual position of the optical elements than the single-lens system. Furthermore, the objective lens 16 is preferably aspherical.

By way of illustration, in the case where the optical record carrier 3 is of a DVD format, the selected numerical aperture of the focused beam 13 approximately equals to 0.60 for the "reading mode" and to 0.65 for the "writing mode."

Thus, during scanning, the focused radiation beam 13 reflects on the information layer 2, thereby forming a reflected beam which returns on the optical path of the forward converging beam 17. The lens system 5 transforms the reflected radiation beam to a first converging reflected radiation beam 63. Finally, the beam splitter 18 separates the forward radiation beam 8 from the reflected radiation beam 17 by transmitting at least part of the reflected radiation beam 63 towards the detection system 6, in the form of a radiation beam 21.

The detection system 6 is arranged for capturing the radiation beam 21 and the satellite radiation beams and converting them to one or more electrical signal. One of the signals is an information signal $I_{data}$, the value of which represents the information scanned on the information layer 2. The information signal $I_{data}$ is processed by the information processing unit 6C for error correction. Other signals from the detection system 6 are a focus error signal $I_{focus}$ and a radial tracking error signal $I_{radial}$. The signal $I_{focus}$ represents the axial difference in height (along the optical axis of the lens system 5) between the scanning spot 14 and the position of the information layer 2. Preferably, this signal is formed from the "astigmatic method" as described above.

The radial tracking error signal $I_{radial}$ represents the distance in the plane of the information layer 2 between the scanning spot 14 and the center of a track in the information layer 2 to be followed by the scanning spot 14. Preferably, this signal is formed from the "radial push-pull method" as described above.

The servocircuit 6A is arranged for, in response to the signals $I_{focus}$ and $I_{radial}$, providing servo control signals $I_{control}$ for controlling the focus actuator 6B and the radial actuator 6D, respectively. The focus actuator 6B controls the position of the objective lenses 15 and 16 along the optical axis of the lens system 5, thereby controlling the position of the scanning spot 14 such that it coincides substantially with the plane of the information layer 2. The radial actuator 6D controls the position of the objective lenses 15 and 16 in a direction perpendicular to the optical axis of the lens system 5, thereby controlling the radial position of the scanning spot 14 such that it coincides substantially with the center line of the track to be followed in the information layer 2.

FIG. 2 is a schematic illustration of the detection system 6 of FIG. 1; it shows in detail that the detection system 6 includes an astigmatism generating element (preferably formed by the beam splitter 18), a coma correcting element 19 and a quadrant detector 20. As a matter of purely arbitrary choice, the reference "Z-axis" designates the direction of the optical axis OO' of the lens system 5, and the references "X-axis" and "Y-axis" designate the two directions of the quadrant detector 12 that corresponds to the radial and tangential directions, respectively.

The astigmatism generating element 18 is arranged for transforming the radiation beam 8 to a first astigmatic radiation beam 21. Furthermore, the astigmatism generating element 18 generates a first amount of coma so that the astigmatism radiation beam 21 includes coma. In the preferred case where the astigmatism generating element is formed by the plane parallel plate that forms the beam splitter 18, the plate forms the angle α with respect to the Z-axis, that preferably equals 45 degrees, as described above. In this preferred case, said first amount of coma may be expressed in the form of the Siedel coefficient $W_{31rms}^{a}$ similarly to that given by Equation (1).

The coma correcting element 19 is arranged for generating a second amount of coma so as to compensate said first amount of coma (that is, in the preferred case, $W_{31rms}^{a}$), thereby transforming the astigmatic radiation beam 21 to a second astigmatic radiation beam 22 that is substantially free from coma aberration (the term "substantially" being explained below). In the following, said second amount of coma may be expressed in the form of the root-mean-square $W_{31rms}^{b}$ of the Siedel coefficient $W_{31}^{b}$. Furthermore, the coma correcting element 19 is formed by a correction surface 19A having a shape defined by a function "H(r, θ)" that includes the term "A.r³.cos(θ)" wherein: "H" is the position of the correction surface along the optical axis of the lens system, "r" and "θ" designate polar coordinates in a cross-section of the astigmatic radiation beam 21, and "A" designates a first constant dependent on the amount of coma generated by the coma correction element 19 (that is, on the normalized root-mean-square $W_{31rms}^{b}$ as described below in further detail).

In a preferred embodiment of the optical scanning device 1, the function "H(r,θ)" is defined by:

$$H(r,\theta)=A.r^3.\cos(\theta)+B.r+C.r^2.\cos^2(\theta-\theta o) \quad (3)$$

wherein: "H," "r," "θ," are those defined above, and "B," "C" and "θo" designate a second constant, a third constant and a fourth constant, respectively.

In a preferred embodiment of the optical scanning device 1, the correction surface 19A is formed as the entrance surface of a lens 19', thereby the exit surface 19B of the lens 19' to provide an additional optical function. For instance, the exit surface 19B may be spherically curved in order to form a spherical lens. Three embodiments of the lens 19' that include three embodiments of the correction surface 19A are described in detail below.

The quadrant detector 20 is arranged for converting the astigmatic radiation beam 22 to the signals $I_{data}$, $I_{focus}$ and $I_{radial}$. In order to generate the signal $I_{focus}$ according to the "astigmatic method," the quadrant detector 20 includes: (a) four first radiation-sensitive detection elements C1 through C4 (as shown in FIG. 2) for providing four detection signals $I_{C1}$, $I_{C2}$, $I_{C3}$ and $I_{C4}$, respectively, and (b) a first electronic circuit for, in response to the signals $I_{C1}$ through $I_{C4}$, providing the signals $I_{data}$ and $I_{focus}$. In order to generate the radial-tracking error signal $I_{radial}$ according to the well-known "radial push-pull method," the detection system 39 includes second radiation-sensitive detection elements and a second electronic circuit for, in response to the output signals of these detection elements, providing the signal $I_{radial}$.

Figure 3:
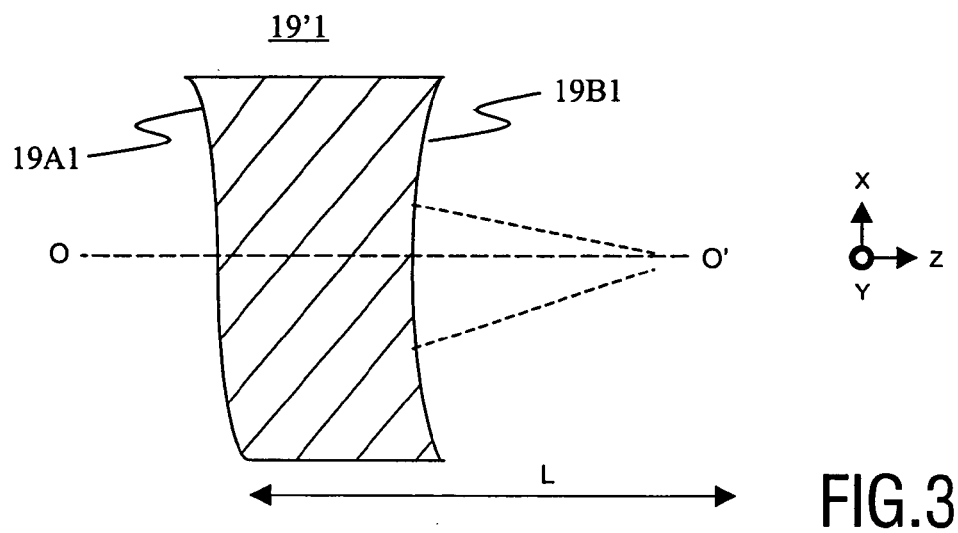

Three embodiments of the lens 19' that include three embodiments of the correction surface 19A are now described in detail. FIGS. 3 through 5 show the cross-sectional views of first, second and third embodiments of the lens 19' that include first second and third embodiments of the correction surface 19A, respectively. The reference numerals 19'1, 19'2 and 19'3 designate the first, second and third embodiments of the lens 19', respectively, the reference numerals 19A1, 19A2 and 19A3 designate the first, second and third embodiments of the correction surface 19A, respectively, and the reference numerals 19B1, 19B2 and 19B3 designate the first, second and third embodiments of the exit surface of the lenses 19'1, 19'2 and 19'3, respectively.

With reference to FIG. 3, in the case where A≠0, B=0 and C=0 in Equation (3), the correction surface 19A1 corresponds to the following equation:

$$H1(r,\theta) = A1.r^3.\cos(\theta) \tag{4}$$

wherein "A1" corresponds to the constant "A" defined with respect to Equation (3). As previously stated, A1 depends on $W_{31rms}^b$; more specifically, it is given by the following equation:

$$A1 = \frac{W_{31rms}^b \cdot \lambda \cdot \sqrt{72}}{L^3 \cdot NA^3 \cdot (n_{lens} - 1)} \tag{5}$$

wherein: "$W_{31rms}^b$" is the "root-mean-square" value associated with the amount of coma $W_{31}^b$ generated by the correction surface 19A1; "λ" is the wavelength of the astigmatic radiation beam 22; "L" is the distance from the correction surface 19A1 to object of the spherical lens 19B1 (as shown in FIG. 3); "NA" is the numerical aperture of the astigmatic radiation beam 22; and "$n_{lens}$" is the refractive index of the lens 19'1. Furthermore, in order to compensate the amount of coma generated by the plane parallel plate 18, the value $W_{31rms}^b$ in Equation (5) is to ideally equal the "root-mean-square" value $W_{31rms}^a$ given by Equation (1).

By way of illustration only, if d=1.1 mm, NA=0.135, α=45 degrees and n=1.51 in Equation (1), the value $W_{31rms}^a$ equals to 71 mλrms. And, if $n_{lens}$=1.57, NA=0.16, λ=790 nm, L=2.8 mm, an ideal value $A1_{ideal}$ of the constant A1 is finally known from Equation (5) where $W_{31rms}^b$ ideally equals 71 mλrms. In practice, the ideal value $A1_{ideal}$ cannot be obtained and the actual value $A1_{actual}$ of the parameter results in compensating the first amount of coma $W_{31}^a$ so as to form the second astigmatic radiation beam 22 that is substantially free from coma. For instance, if $A1_{actual}$=0.1 mm$^{-2}$, the resulting value $W_{31rms}^b$ equals to 71 mλrms. In other words, a difference of 5 mλrms between the ideal and actual values may be tolerate; in the description, "substantially free from coma" means that the "root-square-mean" value of the resulting amount of coma in the astigmatic radiation beam 22 is less than 10 mλrms.

With reference to FIG. 4, in the case where A≠0, B≠0 and C=0 in Equation (3), the correction surface 19A2 corresponds to the following equation:

$$H2(r,\theta) = A2.r^3.\cos(\theta) + B2.r$$

wherein "A2" and "B2" correspond to the constants "A" and "B," respectively, defined with respect to Equation (3). In the case where the astigmatism generating element 18 is formed by a plate, the constant A2 may be calculated as described with respect to FIG. 3. The constant B2 represents a constant tilt of the correction surface 19A2 for compensating the average tilt of the correction surface curved by the term "A.r$^3$.cos(θ)" in the Y-direction; it typically is less than one degree. Notably, the constant tilt has no significant effect on the coma correction; however, it makes the correction surface 19A2 advantageous with respect to the surface 19A1, in terms of mould making. Another advantage of forming such a cylindrical surface is that it generates a second amount of astigmatism in addition to the amount generated by the plane parallel plate.

With reference to FIG. 5, in the case where A≠0, B≠0, C≠0 and θo=0 in Equation (3), the correcting surface 19A3 corresponds to the following equation:

$$H3(r,\theta) = A3.r^3 \cos\theta + B3.r + C3.r^2.\cos^2(\theta)$$

wherein "A3," "B3" and "C3" correspond to the constants "A," "B" and "C", respectively, defined with respect to Equation (3). Notably, the "C3.r$^2$cos$^2$(θ)" term represents a cylindrical surface that generates an additional amount of astigmatism that is added to the amount of astigmatism generated by the plate 18, i.e. $W_{22}$ as expressed in Equation (2); the coefficient C3 then may be expressed as follows:

$$C3 \approx \frac{1}{2 \cdot Rcyl}$$

wherein "Rcyl" is the cylinder radius associated with the cylindrical surface.

Alternatively, in the case where C≠0 and θo≠0, the azimuth of the corresponding cylindrical surface forms an angle θo with respect to the Y-direction. This advantageously results in rotating the focal lines of the astigmatic radiation beam 21 that emerges from the plane parallel plate 18.

As a matter of illustration, the operation of the optical scanning device 1 is described below—in particular, the effect of the coma correcting element 19 on the radiation beam 21. FIGS. 6A and 6B are schematic representations of the cross-sections of the radiation beam 22 on the quadrant detector 20, with and without correction according to the invention, respectively. And FIGS. 7A and 7B show the focus S-curves (that have been produced by simulation) with respect to the radiation beam 22 that is incident to the quadrant-detector, with and without correction according to the invention, respectively.

FIGS. 6A and 6B show dots that represent the intersection of rays of the radiation beam 22 with the plane of the quadrant detector 20. With reference to FIG. 6A, the astigmatic radiation beam 22, with coma correction according to the invention, is substantially symmetrical with respect to the center of the beam. With reference to FIG. 6B, the astigmatic radiation beam 22, without correction according to the invention, is affected by the first amount of coma and is consequently symmetrical with respect to the center of the beam.

In relation to FIG. 7A and FIG. 7B, the normalized value FE of the focus-S curves (with respect to the maximum value of the signal $I_{focus}$) are derived from a measurement of the detection signals $I_{C1}$ through $I_{C4}$ according to the following equation:

$$FE = \frac{I_{c1} + I_{c3} - I_{c2} - I_{c4}}{I_{c1} + I_{c3} + I_{c2} + I_{c4}}$$

With reference to FIG. 7A, the focus-S curve 61 associated with the astigmatic radiation beam 22, with correction according to the invention is substantially symmetrical with respect to the point that corresponds to FE=0.

With reference to FIG. 7B, the focus-S curve 62 associated with the astigmatic radiation beam 22, without correction according to the invention, has a peak 63 that is affected by the presence of coma in the radiation beam 22. The skilled person notes that a disadvantage of the presence of such a peak is that the optical scanning device is particularly sensitive to chocks.

An advantage of such a coma correcting element is that, when adjusting the position of the lens 19' with respect to the quadrant-detector 20 for focus adjustment purposes, it results in an insignificant change in the amount of coma generated by the correcting element. For instance, calculations have shown that a change of 0.2 mm in the position of the lens 19' along the axis OO' results in a change of 5 mλrms in the generated amount of coma which is considered not to be significant with respect to 71 mλrms.

It is to be appreciated that numerous variations and modifications may be employed in relation to the embodiments described above, without departing from the scope of the invention which is defined in the appended claims.

As an alternative, the coma correcting element may be combined with any astigmatism generating element other than a plane parallel plate, that further generates coma aberration.

As an alternative, the optical scanning device may be of the type capable to performing simultaneous multi-track scanning. This results in improving data read-out in the "reading mode" and/or write speed in the "writing mode" as described, for example, in U.S. Pat. No. 4,449,212. The description of the multi-tracking arrangement according to U.S. Pat. No. 4,449,212 is incorporated herein by reference.

The invention claimed is:

1. An optical scanning device (1) for scanning an information layer (2) of an optical record carrier (3), the device including:
    a radiation source (4) for supplying a radiation beam (8),
    a lens system (5) for transforming said radiation beam to a scanning spot (14) in the position of said information layer, this system having an optical axis (OO'), and
    a detection system (6) including:
        an astigmatism generating element (18) for transforming said radiation beam to a first astigmatic radiation beam (21), this element further generating a first amount of coma ($W_{31}^a$) so that the first astigmatic radiation beam includes coma aberration,
        a coma correcting element (19) for generating a second amount of coma ($W_{31}^b$) so as to compensate said first amount of coma, thereby transforming said first astigmatic radiation beam to a second astigmatic radiation beam (22) that is substantially free from coma aberration, and
        a quadrant detector (20) for transforming said second astigmatic radiation beam to an electrical signal,
    characterized in that said coma correcting element includes a correction surface (19A) having a shape defined by a function H(r,θ) that includes the term $A.r^3.\cos(\theta)$ wherein: "H" is the position of said correction surface along the optical axis of said lens system, "r" and "θ" designate polar coordinates in a cross-section of said first astigmatic radiation beam, and "A" designates a first constant dependent on said second amount of coma.

2. The optical scanning device (1) as claimed in claim 1, characterized said function "H(r,θ)" is defined by:

$$H(r,\theta)=A.r^3.\cos(\theta)+B.r+C.r^2.\cos^2(\theta-\theta o)$$

wherein "B," "C" and "θo" designate a second constant, a third constant and a fourth constant, respectively.

3. The optical scanning device (1) as claimed in claim 1, characterized in that said astigmatism generating element (18) is formed by a plane parallel plate inclined at a predetermined angle (α) with respect to said optical axis (OO').

4. The optical scanning device (1) as claimed in claim 1, characterized in that said correction surface (19A) is formed as the entrance surface of a lens (19'), and in that said lens has a anisotropically curved exit surface (19B).

5. The optical scanning device (1) as claimed in claim 1, characterized in that said detection system (6) is further arranged for providing a focus error signal ($I_{focus}$) and/or a radial-tracking error signal ($I_{radial}$) and in that it further includes a servocircuit (6A) and an actuator (6B) responsive to said focus error signal and/or said radial-tracking error signal for controlling the position of said scanning spot (14) with respect to the position of said information layer (2) and/or of a track of said information layer which is to be scanned.

6. The optical scanning device (1) as claimed in claim 1, characterized in that it further includes an information processing unit for error correction (6C).

* * * * *